(12) United States Patent
Lee et al.

(10) Patent No.: US 10,957,265 B2
(45) Date of Patent: Mar. 23, 2021

(54) DISPLAY APPARATUS AND METHOD OF DRIVING THE SAME

(71) Applicant: Samsung Display Co., Ltd., Yongin-Si (KR)

(72) Inventors: Neung-beom Lee, Hwaseong-si (KR); Junpyo Lee, Asan-si (KR); Sangan Kwon, Cheonan-si (KR); Kyunho Kim, Hwaseong-si (KR); Sungjin Kim, Gwangju (KR); Yong-jin Shin, Asan-si (KR); Shimho Yi, Seoul (KR); Kyung-hwa Lim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 115 days.

(21) Appl. No.: 16/012,000

(22) Filed: Jun. 19, 2018

(65) Prior Publication Data

US 2019/0035341 A1 Jan. 31, 2019

(30) Foreign Application Priority Data

Jul. 28, 2017 (KR) ........................ 10-2017-0096507

(51) Int. Cl.
*G09G 3/36* (2006.01)
*G09G 5/10* (2006.01)
(Continued)

(52) U.S. Cl.
CPC ......... *G09G 3/3607* (2013.01); *G02F 1/1368* (2013.01); *G02F 1/13306* (2013.01);
(Continued)

(58) Field of Classification Search
CPC ....... G09G 2310/08; G09G 2320/0242; G09G 2320/041; G09G 3/3607; G09G 3/3648; G09G 3/3688; G02F 1/13306
See application file for complete search history.

(56) References Cited

U.S. PATENT DOCUMENTS

| 9,299,300 B2 | 3/2016 | Oh et al. |
| 2010/0156885 A1* | 6/2010 | Cho ........................ G09G 3/006 345/214 |

(Continued)

FOREIGN PATENT DOCUMENTS

| JP | 4559899 B2 | 10/2010 |
| KR | 1020080039719 A | 5/2008 |

(Continued)

*Primary Examiner* — Chanh D Nguyen
*Assistant Examiner* — Nguyen H Truong
(74) *Attorney, Agent, or Firm* — Cantor Colburn LLP

(57) ABSTRACT

A display apparatus includes a display panel including display blocks, where each of the display blocks includes a plurality of pixels, a gate driver which outputs gate signals to the pixels, a data driver which receives image data and outputs data voltages corresponding to the image data to the pixels, and a timing controller which converts an image signal input thereto, outputs the converted image signal to the data driver as the image data, and controls a driving timing of the gate driver and the data driver. The timing controller controls output timings of at least data voltages output to pixels of a predetermined display block among the data voltages provided to the pixels of the display blocks, depending on a color pattern of the image signal corresponding to the pixels of the predetermined display block.

20 Claims, 11 Drawing Sheets

(51) Int. Cl.
*G02F 1/1368* (2006.01)
*G02F 1/133* (2006.01)
*G02F 1/1362* (2006.01)
*G02F 1/1343* (2006.01)

(52) U.S. Cl.
CPC .. *G02F 1/134309* (2013.01); *G02F 1/136213* (2013.01); *G09G 3/3648* (2013.01); *G09G 3/3688* (2013.01); *G02F 2001/134345* (2013.01); *G02F 2201/121* (2013.01); *G02F 2201/123* (2013.01); *G09G 2310/08* (2013.01); *G09G 2320/0242* (2013.01); *G09G 2320/041* (2013.01)

(56) References Cited

U.S. PATENT DOCUMENTS

| 2011/0074745 | A1* | 3/2011 | Chang | G09G 3/20 |
| | | | | 345/204 |
| 2013/0113848 | A1* | 5/2013 | Bae | G09G 3/3688 |
| | | | | 345/691 |
| 2017/0193892 | A1* | 7/2017 | Ha | G09G 3/2092 |
| 2018/0182278 | A1* | 6/2018 | Kim | G09G 3/3275 |

FOREIGN PATENT DOCUMENTS

| KR | 1020140082142 A | 7/2014 |
| KR | 1020150107484 A | 9/2015 |
| KR | 101621553 B1 | 5/2016 |
| KR | 1020160085929 A | 7/2016 |
| KR | 101696462 B1 | 1/2017 |

\* cited by examiner

DISPLAY APPARATUS AND METHOD OF DRIVING THE SAME

This application claims priority to Korean Patent Application No. 10-2017-0096507, filed on Jul. 28, 2017, and all the benefits accruing therefrom under 35 U.S.C. § 119, the content of which in its entirety is herein incorporated by reference.

BACKGROUND

1. Field of Disclosure

Exemplary embodiments of the invention relate to a display apparatus and a method of driving the same. More particularly, the invention relates to a display apparatus capable of controlling output timings of data voltages and a method of driving the display apparatus.

2. Description of the Related Art

In general, a display apparatus includes a display panel including pixels to display an image, a gate driver applying gate signals to the pixels, a data driver applying data voltages to the pixels, and a timing controller controlling a driving timing of the gate driver and the data driver.

The gate driver and the data driver generate the gate signals and the data voltages by a control of the timing controller to drive the pixels. The pixels receive the gate signals through gate lines. The pixels receive the data voltages through data lines in response to the gate signals. The pixels display grayscales corresponding to the data voltages, and thus the image is displayed.

SUMMARY

The invention provides a display apparatus capable of controlling output timings of data voltages provided to display blocks of a display panel to improve a display quality.

The invention provides a method of driving the display apparatus.

Embodiments of the inventive concept provide a display apparatus including a display panel which includes a plurality of display blocks, where each of the plurality of display blocks includes a plurality of pixels, a gate driver which outputs gate signals to the pixels, a data driver which receives image data and outputs data voltages corresponding to the image data to the pixels, and a timing controller which converts an image signal input thereto, outputs the converted image signal to the data driver as the image data, and controls a driving timing of the gate driver and the data driver. The timing controller controls output timings of at least data voltages output to the pixels of a predetermined display blocks among the data voltages provided to the pixels of the plurality of display blocks, depending on a color pattern of the image signals corresponding to the pixels of the predetermined display block.

In an exemplary embodiment, the data driver may include a plurality of source driving chips that receives the image data and outputs the data voltages, and the source driving chips may be connected to the display blocks respectively and output the data voltages to the pixels.

In an exemplary embodiment, the timing controller may generate a plurality of source output enable signals, output the source output enable signals to the source driving chips, respectively, and control the output timings of at least data voltages output to the pixels of the predetermined display block.

In an exemplary embodiment, the display blocks may include an error block defined as the predetermined display block and a normal block other than the error block, the source driving chips may include an error source driving chip connected to the error block and a normal source driving chip connected to the normal block, and the source output enable signals may include a first source output enable signal output to the error source driving chip and a second source output enable signal output to the normal source driving chip.

In an exemplary embodiment, the timing controller may shift an output timing of the first source output enable signal such that the output timing of the first source output enable signal is ahead of an output timing of the second source output enable signal.

In an exemplary embodiment, the color pattern of the image signals may include a first pattern having a first color, a second pattern having a second color, and a third pattern having a third color other than the first and second colors.

In an exemplary embodiment, in a case that the color pattern of the image signals is the first pattern, the timing controller may shift an output timing of the first source output enable signal to be ahead of an output timing of the second source output enable signal by a first period, in a case that the color pattern of the image signals is the second pattern, the timing controller may shift the output timing of the first source output enable signal to be ahead of the output timing of the second source output enable signal by a second period, in a case that the color pattern of the image signals is the third pattern, the timing controller may shift the output timing of the first source output enable signal to be ahead of the output timing of the second source output enable signal by a third period, the second period may be longer than the first period, and the third period may be longer than the first period and shorter than the second period.

In an exemplary embodiment, the display apparatus may further include a temperature detector which detects a surrounding temperature of the display panel. The timing controller may shift the output timing of the first source output enable signal to be ahead of the output timing of the second source output enable signal by an additional period in addition to the first period, the second period, or the third period, in a case that the detected temperature is equal to or higher than a reference temperature.

Embodiments of the inventive concept provide a method of driving a display apparatus including receiving an image signal and analyzing a color pattern of the image signal, converting the received image signal to image data, generating data voltages corresponding to the image data, and outputting the data voltages to pixels of a plurality of display blocks. Applying the data voltages to the pixels includes controlling output timings of at least data voltages output to the pixels of a predetermined display block among the data voltages provided to the pixels of the plurality of display blocks, depending on the color pattern of the image signal corresponding to the pixels of the predetermined display block.

According to the invention, the display apparatus and the driving method of the display apparatus control the output timings of the data voltages applied to the display blocks of the display panel to match the output timings of the data voltages with each other, and thus the display quality may be improved.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION

Figure 1:
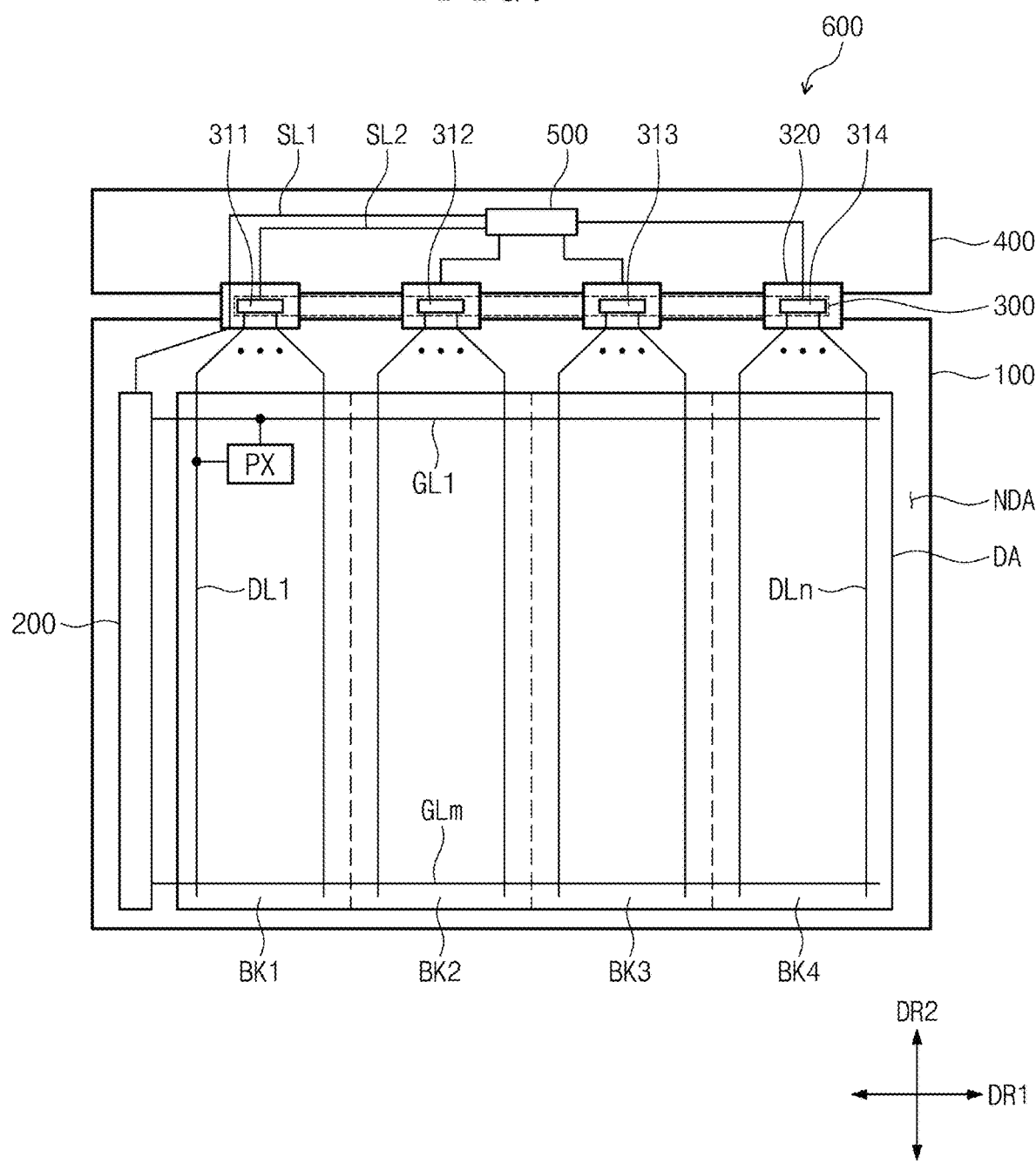
FIG. 1 is a plan view showing an exemplary embodiment of a display apparatus according to the invention.

Features of the inventive concept and methods of accomplishing the same may be understood more readily by reference to the following detailed description of preferred exemplary embodiments and the accompanying drawings. The inventive concept may, however, be embodied in many different forms and should not be construed as being limited to the exemplary embodiments set forth herein. Rather, these exemplary embodiments are provided so that this disclosure will be through and complete and will fully convey the inventive concept to those skilled in the art, and the inventive concept will only be defined by the appended claims. Like reference numerals denote like elements throughout the specification.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. As used herein, the term "and/or" includes any and all combinations of one or more of the associated listed items.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Example embodiments are described herein with reference to plan views and cross-sectional views that are schematic illustrations of idealized example embodiments. As such, variations from the shapes of the illustrations as a result, for example, of manufacturing techniques and/or tolerances, are to be expected. Thus, example embodiments should not be construed as limited to particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of the example embodiments.

Hereinafter, the present invention will be explained in detail with reference to the accompanying drawings.

Figure 2:
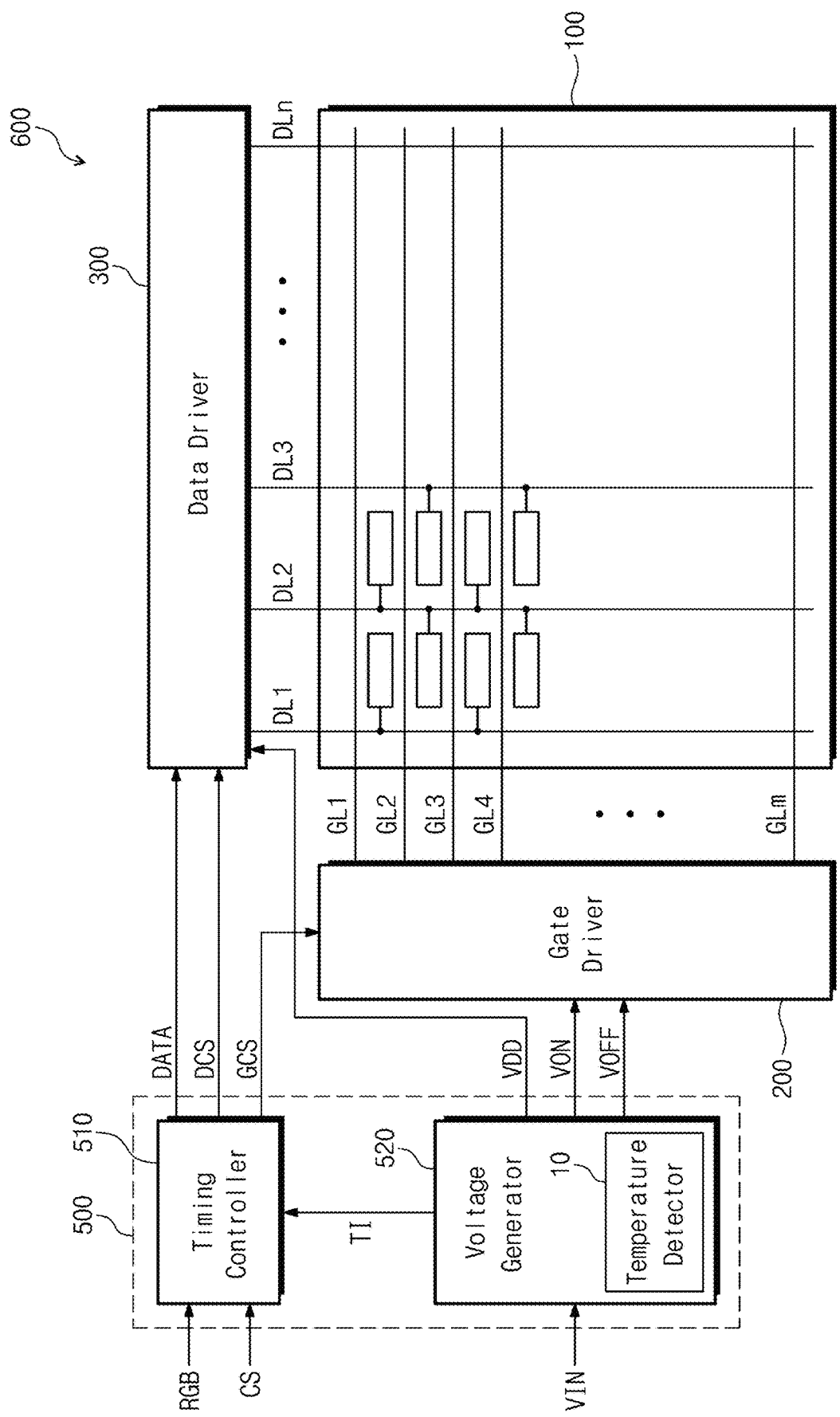
FIG. 2 is a block diagram showing an exemplary embodiment of the display apparatus shown in FIG. 1.

FIG. 1 is a plan view showing an exemplary embodiment of a display apparatus 600 according to the invention. FIG. 2 is a block diagram showing an exemplary embodiment of the display apparatus 600 shown in FIG. 1. FIG. 2 shows functional blocks of the display apparatus 600 shown in FIG. 1 except for a printed circuit board 400.

Referring to FIGS. 1 and 2, the display apparatus 600 includes a display panel 100, a gate driver 200, a data driver 300, the printed circuit board 400, and a controller 500.

The display panel 100 may have a rectangular shape with long sides in a first direction DR1 and short sides in a second direction DR2 crossing the first direction DR1. The display panel 100 may be a liquid crystal display panel including a liquid crystal layer. However, the display panel 100 according to the invention should not be limited to the liquid crystal display panel. That is, alternatively, various kinds of panels, such as an electrophoretic display panel including an electrophoretic layer, an electrowetting display panel including an electrowetting layer, an organic light emitting display panel including an organic light emitting layer, etc., may be used as the display panel 100.

The display panel 100 includes a plurality of gate lines GL1 to GLm, a plurality of data lines DL1 to DLn, and a plurality of pixels PX. Each of m and n is a natural number. The display panel 100 includes a display area DA displaying an image and a non-display area NDA disposed to surround the display area DA in a plan view. The non-display area NDA does not display the image.

The gate lines GL1 to GLm and the data lines DL1 to DLn are insulated from each other while crossing each other. The gate lines GL1 to GLm extend in the first direction DR1 and are connected to the gate driver 200. The data lines DL1 to DLn extend in the second direction DR2 and are connected to the data driver 300.

The pixels PX are arranged in areas defined by the gate lines GL1 to GLm and the data lines DL1 to DLn. The pixels PX are arranged in a matrix form and connected to the gate lines GL1 to GLm and the data lines DL1 to DLn. Each of the pixels PX may display one of primary colors. The primary colors may include a red color, a green color, a blue color, and a white color, but the primary colors according to the invention should not be limited thereto or thereby. That is, the primary colors may further include a yellow color, a cyan color, and a magenta color.

Each of the pixels PX may have a rectangular shape with long sides in the first direction DR1 and short sides in the second direction DR2. The pixels PX arranged in an 1-th row may be connected to an i-th gate line. Each of 1 and i is a natural number. The pixels arranged in a k-th column may be arranged between a j-th data line and a j+1-th data line. Each of k and j is a natural number. The pixels PX arranged in the k-th column may be alternately connected to the j-th data line and the j+1-th data line.

The display panel 100 may include a plurality of display blocks BK1 to BK4 arranged in the first direction DR1. For instance, the display area DA of the display panel 100 may be divided into the display blocks BK1 to BK4. The display blocks BK1 to BK4 include first, second, third, and fourth display blocks BK1, BK2, BK3, and BK4. In FIG. 2, four display blocks BK1 to BK4 are shown, but the number of the display blocks according to the invention should not be limited to four. Plural pixels PX may be arranged in each of the first, second, third, and fourth display blocks BK1, BK2, BK3, and BK4.

The gate driver 200 may be disposed in the non-display area NDA of the display panel 100, which is adjacent to one short side of the short sides of the display panel 100. The gate driver 200 may be provided through the same process as transistors of the pixels PX and mounted on the display panel 100 in an amorphous silicon TFT gate driver circuit ("ASG") form or an oxide silicon TFT gate driver circuit ("OSG") form, but the form of the gate driver 200 according to the invention should not be limited thereto or thereby. That is, alternatively, the gate driver 200 may include a plurality of gate driving chips, and the gate driving chips may be connected to the display panel 100 through flexible printed circuit boards or mounted on the display panel 100 in a chip-on-glass ("COG") manner.

The data driver 300 may include a plurality of source driving chips 311 to 314, and the source driving chips 311 to 314 may be mounted on flexible printed circuit boards 320. Through the flexible printed circuit boards 320, the source driving chips 311 to 314 may be connected to the printed circuit board 400 and the non-display area NDA of the display panel 100 which is adjacent to one long side of the long sides of the display panel 100. That is, the data driver 300 may be connected to the display panel 100 in a manner of a tape carrier package ("TCP"), but it should not be limited thereto or thereby. In another exemplary embodiment, the source driving chips 311 to 314 may be mounted on the display panel 100 in a chip-on-glass ("COG") manner. In this exemplary embodiment, the number of the source driving chips 311 to 314 is equal to the number of the display blocks BK1 to BK4, and the source driving chips 311 to 314 are arranged to correspond to the display blocks BK1 to BK4, respectively. Each of the source driving chips 311 to 314 is connected to a corresponding display block among the display blocks BK1 to BK4. For instance, each of the source driving chips 311 to 314 is connected to h data lines among the data lines DL1 to DLn and connected to the pixels PX of the corresponding display block through the h data lines. The h is a natural number. The source driving chips 311 to 314 include first, second, third, and fourth source driving chips 311, 312, 313, and 324 connected to the first, second, third, and fourth display blocks BK1, BK2, BK3, and BK4, respectively.

The controller 500 may be disposed on the printed circuit board 400. The controller 500 is connected to the gate driver 200 and the data driver 300 through a plurality of control signal lines SL1 and SL2. The control signal lines include a first control signal line SL1 connecting the controller 500 to the gate driver 200 and a second control signal line SL2 connecting the controller 500 to the data driver 300. The controller 500 applies signals to drive the gate driver 200 and the data driver 300 to the gate driver 200 and the data driver 300, respectively.

The controller 500 includes a timing controller 510 and a voltage generator 520. The timing controller 510 may be mounted on the printed circuit board 400 in an integrated circuit chip form. The timing controller 510 receives a plurality of image signals RGB to be used for displaying the image and control signals CS to be used for controlling a driving timing of the gate driver 200 and the data driver 300 from an external source (e.g., a system board).

The image signals RGB may include red, green, and blue data. The control signals CS may include a vertical synchronization signal as a frame distinction signal, a horizontal synchronization signal as a row distinction signal, a data enable signal maintained at a high level during a period, in which data are output, to indicate a data input period, and a main clock signal.

The timing controller 510 converts a data format of the image signals RGB to a data format adaptive to an interface between the data driver 300 and the timing controller 510. The timing controller 510 provides the converted image data DATA to the data driver 300. The timing controller 510 generates a gate control signal GCS and data control signals DCS in response to the control signals CS. The gate control signal GCS is a control signal to control an operation timing of the gate driver 200. The data control signals DCS are control signals to control an operation timing of the data driver 300.

The voltage generator 520 receives an input voltage Vin from an external source and generates a driving voltage VDD, a gate-on voltage VON, and a gate-off voltage VOFF based on the input voltage Vin. The driving voltage VDD is provided to the source driving chips 311 to 314 of the data driver 300, and the gate-on voltage VON and the gate-off voltage VOFF are provided to the gate driver 200.

The gate driver 200 receives the gate control signal GCS from the timing controller 510. The gate driver 200 generates a plurality of gate signals based on the gate control signal GCS, the gate-on voltage VON, and the gate-off voltage VOFF and sequentially outputs the generated gate signals. The gate signals have a high level corresponding to the gate-on voltage VON and a low level corresponding to the gate-off voltage VOFF The gate signals are provided to the pixels PX through the gate lines GL1 to GLm in the unit of row of the pixels PX.

The data driver 300 receives the image data DATA and the data control signals DCS from the timing controller 510. The data driver 300 generates and outputs data voltages corresponding to the image data DATA in analog form in response to the data control signals DCS. The data voltages may be generated based on the driving voltage VDD. The data voltages are provided to the pixels PX through the data lines DL1 to DLn.

The timing controller 510 applies the data control signals DCS to the source driving chips 311 to 314 to control the source driving chips 311 to 314. For instance, corresponding data control signals DCS are applied to the source driving chips 311 to 314 respectively, and each of the source driving chips 311 to 314 generates the data voltages in response to a corresponding data control signal DCS among the data control signals DCS.

The pixels PX receive the gate signals through the gate lines GL1 to GLm and receive the data voltages through the data lines DL1 to DLn in response to the gate signals applied thereto. The pixels PX display grayscales corresponding to the data voltages and therefore display the image.

The voltage generator 520 may include a temperature detector 10 to detect a surrounding temperature of the display panel 100. Temperature information TI including the surrounding temperature value detected by the temperature detector 10 is provided to the timing controller 510. The timing controller 510 analyzes a color pattern of the image signals RGB and controls the source driving chips 311 to 314 depending on the color pattern of the image signals RGB and the temperature information TI such that the output timings of the data voltages applied to predetermined display blocks among the display blocks BK1 to BK4 is controlled. This operation will be described in detail later.

Figure 3:
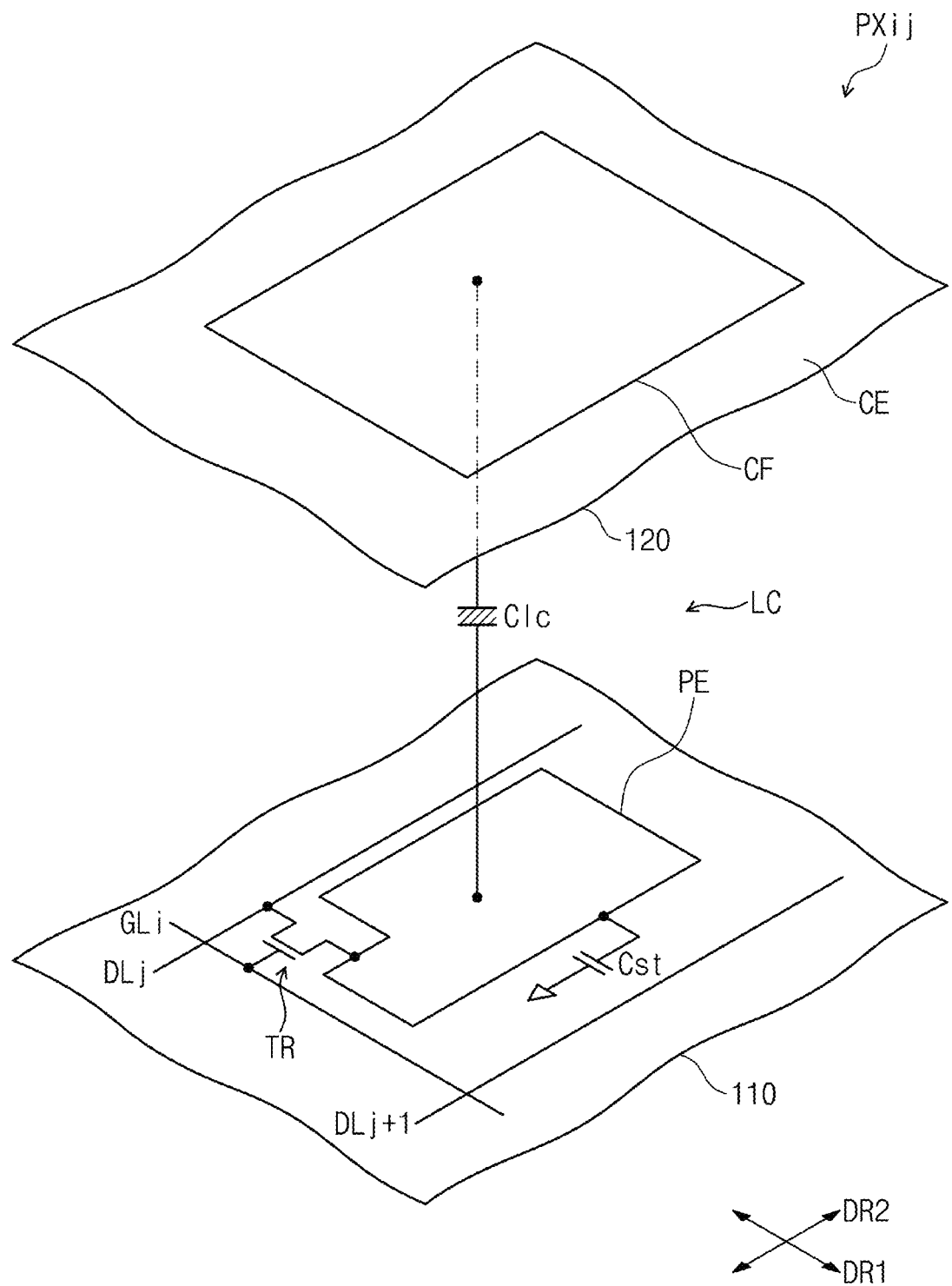
FIG. 3 is a view showing an exemplary embodiment of a configuration of a pixel shown in FIG. 2.

FIG. 3 is a view showing an exemplary embodiment of a configuration of a pixel shown in FIG. 2.

For the convenience of explanation, FIG. 3 shows a pixel PXij connected to a gate line GLi and a data line DLj. Although not shown in FIG. 3, other pixels PX of the display panel 100 may have the same structure and function as those of the pixel PXij shown in FIG. 3.

Referring to FIG. 3, the pixel PXij includes a transistor TR connected to the gate line GLi and the data line DLj, a liquid crystal capacitor Clc connected to the transistor TR, and a storage capacitor Cst connected to the liquid crystal capacitor Clc in parallel. The storage capacitor Cst may be omitted.

The transistor TR may be disposed on a first substrate 110. The transistor TR includes a gate electrode (not shown) connected to the gate line GLi, a source electrode (not shown) connected to the data line DLj, and a drain electrode (not shown) connected to the liquid crystal capacitor Clc and the storage capacitor Cst.

The liquid crystal capacitor Clc includes a pixel electrode PE disposed on the first substrate 110, a common electrode CE disposed on a second substrate 120, and the liquid crystal layer LC interposed between the pixel electrode PE and the common electrode CE. The liquid crystal layer LC serves as a dielectric substance. The pixel electrode PE is connected to the drain electrode of the transistor TR.

In FIG. 3, the pixel electrode PE has a non-slit structure, but the structure of the pixel electrode PE according to the invention should not be limited thereto or thereby. That is, the pixel electrode PE may have a slit structure defined by a trunk portion with a cross shape and a plurality of branch portions extending from the trunk portion in a radial direction. The common electrode CE may be disposed over the second substrate 120, but the location of the common electrode CE according to the invention should not be limited thereto or thereby. That is, the common electrode CE may be disposed on the first substrate 110. In this case, at least one of the pixel electrode PE and the common electrode CE may have slits.

The storage capacitor Cst may include the pixel electrode PE, a storage electrode (not shown) branched from a storage line (not shown), and an insulating layer disposed between the pixel electrode PE and the storage electrode. The storage line may be disposed on the first substrate 110 and substantially simultaneously formed with the gate lines GL1 to GLm on the same layer. The storage electrode may be partially overlapped with the pixel electrode PE.

The pixel PX may further include a color filter CF displaying one of red, green, and blue colors. As an example, the color filter CF may be disposed on the second substrate 120 as shown in FIG. 3. However, the color filter CF may be disposed on the first substrate 110 according to other exemplary embodiments.

The transistor TR is turned on in response to the gate signal provided thereto through the gate line GLi. The data voltage provided through the data line DLj is applied to the pixel electrode PE of the liquid crystal capacitor Clc through the turned-on transistor TR. The common electrode CE is applied with a common voltage.

An electric field is generated between the pixel electrode PE and the common electrode CE due to a difference in voltage level between the data voltage and the common voltage. Liquid crystal molecules of the liquid crystal layer LC are driven by the electric field generated between the pixel electrode PE and the common electrode CE. A light transmittance of the liquid crystal layer LC is controlled by the liquid crystal molecules driven by the electric field, and thus the desired image is displayed. Although not shown in figures, a backlight unit may be disposed at a rear side of the display panel 100 to provide a light to the display panel 100.

The storage line is applied with a storage voltage having a constant voltage level, but the storage line may be applied with the common voltage according to other exemplary embodiments. The storage capacitor Cst complements the voltage charged in the liquid crystal capacitor Clc.

Figure 4:
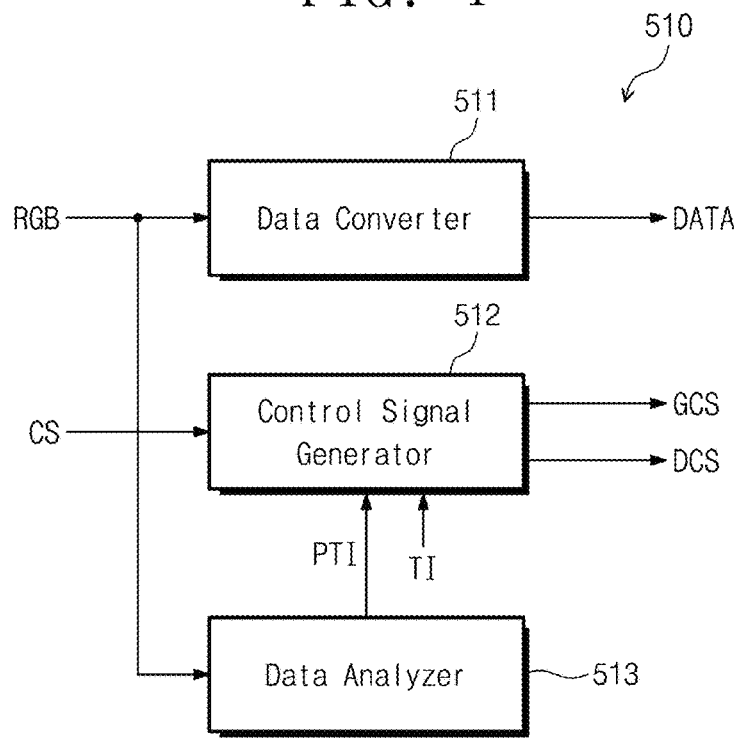
FIG. 4 is a block diagram showing an exemplary embodiment of a timing controller shown in FIG. 2.
Figure 5:
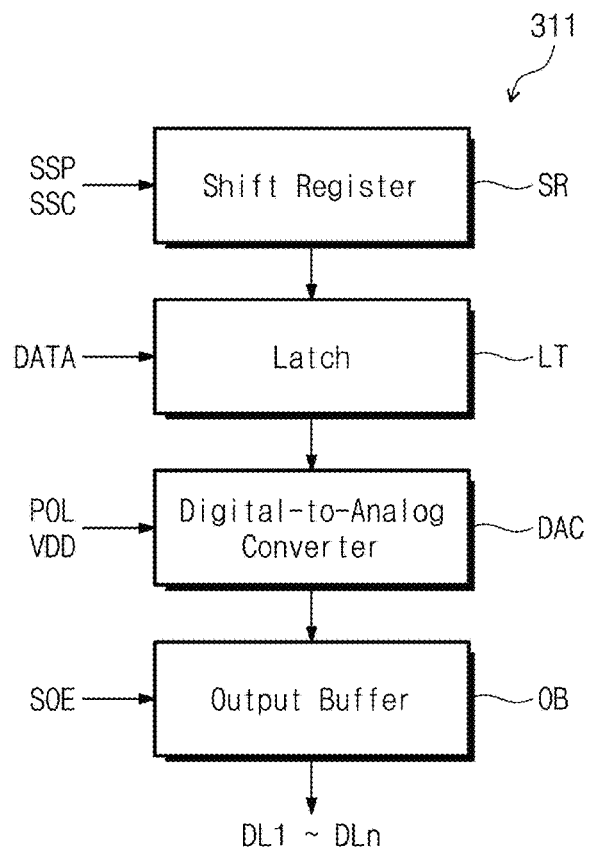
FIG. 5 is a block diagram showing an exemplary embodiment of a first source driving chip shown in FIG. 1.

FIG. 4 is a block diagram showing an exemplary embodiment of the timing controller 510 shown in FIG. 2. FIG. 5 is a block diagram showing an exemplary embodiment of a first source driving chip shown in FIG. 1. FIG. 5 shows the first source driving chip 311 as a representative example, however, other source driving chips 312 to 314 may have the same configuration as that of the first source driving chip 311.

Referring to FIGS. 4 and 5, the timing controller 510 includes a data converter 511, a control signal generator 512, and a data analyzer 513. The data converter 511 receives the image signals RGB, converts the image signals RGB to the image data DATA and then output the image data DATA. The control signal generator 512 receives the control signals CS and generates and outputs the gate control signal GCS and the data control signals DCS in response to the control signals CS.

Each of the data control signals DCS includes a source start pulse SSP, a source shift clock signal SSC, a source output enable signal SOE, and a polarity control signal POL. The first source driving chip 311 includes a shift register SR receiving the source start pulse SSP and the source shift clock signal SSC, a latch LT receiving the image data DATA, a digital-to-analog converter DAC receiving the polarity control signal POL and the driving voltage VDD, and an output buffer OB receiving the source output enable signal SOE.

The shift register SR sequentially shifts the source start pulse SSP in response to the source shift clock signal SSC and output sampling signals. The latch LT sequentially latches the image data DATA in response to the sampling signals and simultaneously outputs the latched image data DATA.

The digital-to-analog converter DAC converts the latched image data DATA in digital form provided from the latch LT to positive and negative analog data voltages based on the driving voltage VDD and the polarity control signal POL and outputs the positive and negative analog data voltages. The output buffer OB outputs the analog data voltages to the data lines DL1 to DLn in response to the source output enable signal SOE. The data voltages may be substantially simultaneously applied to the data lines DL1 to DLn in response to the source output enable signal SOE.

The data analyzer 513 receives the image signals RGB and analyzes the color pattern of the image signals RGB applied thereto. The data analyzer 513 provides color pattern information PTI obtained by analyzing the image signals RGB to the control signal generator 512.

The control signal generator 512 receives the color pattern information PTI and the temperature information TI. The control signal generator 512 controls output timings of the source output enable signals SOE provided to predetermined display blocks among the display blocks BK1 to BK4 in accordance with the color pattern information PTI and the temperature information TI.

Hereinafter, the first and fourth display blocks BK1 and BK4 are defined as error blocks BK1 and BK4, and the second and third display blocks BK2 and BK3 are defined as normal blocks BK2 and BK3. The first and fourth source driving chips 311 and 314 connected to the error blocks BK1 and BK4 are defined as error source driving chips 311 and 314, and the second and third source driving chips 312 and 313 connected to the normal blocks BK2 and BK3 are defined as normal source driving chips 312 and 313.

The color pattern of the image signals RGB may include a first pattern having a first color, a second pattern having a second color, and a third pattern having a third color. The first color may be a skin color, the second color may be a cyan color, and the third color may be an intermediate color between the skin color and the cyan color.

For instance, the image signals RGB may include red data R, green data G, and blue data B, and each of the image signals RGB may have a grayscale value from 0 to 255. The first pattern having the skin color includes the blue data having the grayscale value equal to or smaller than 80, the green data having the grayscale value from 100 to 120, and the red data having the grayscale value of 255. The second pattern having the cyan color includes the blue data having the grayscale value of 255, the green data having the grayscale value from 100 to 120, and the red data having the grayscale value equal to or smaller than 80.

The third color between the skin color and the cyan color may be substantially defined by a color except for the skin color and the cyan color. Accordingly, the third pattern may have grayscale values except for the grayscale values of the first and second patterns. In an exemplary embodiment, for instance, the third pattern includes the blue data having the grayscale value greater than 80 and smaller than 255, the green data having the grayscale value equal to or greater than 0 and smaller than 100 or the grayscale value greater than 120 and equal to or smaller than 255, and the red data having the grayscale value greater than 80 and smaller than 255.

In the case that the color pattern of the image signals RGB is the first pattern, the control signal generator 512 shifts the source output enable signals SOE applied to the error source driving chips 311 and 314 by a first period in response to the color pattern information PTI. In the case that the color pattern of the image signals RGB is the second pattern, the control signal generator 512 shifts the source output enable signals SOE applied to the error source driving chips 311 and 314 by a second period longer than the first period in response to the color pattern information PTI. In the case that the color pattern of the image signals RGB is the third pattern, the control signal generator 512 shifts the source output enable signals SOE applied to the error source driving chips 311 and 314 by a third period longer than the first period and shorter than the second period in response to the color pattern information PTI.

The source output enable signals SOE applied to the error source driving chips 311 and 314 are shifted to be ahead of the source output enable signals SOE applied to the normal source driving chips 312 and 313 by the first period, the second period, or the third period. Accordingly, the output timing of the source output enable signals SOE may be controlled depending on the color pattern of the image signals RGB, and thus the output timings of the data voltages output from the source driving chips 311 to 314 may be controlled.

In the case that the surrounding temperature included in the temperature information TI is lower than a reference temperature, the control signal generator 512 may not shift the source output enable signals SOE applied to the error source driving chips 311 and 314 additionally beside the above shift based on the color pattern. In an exemplary embodiment, the reference temperature may be set to about 45° C. However, in the case that the surrounding temperature included in the temperature information TI is equal to or higher than the reference temperature, the control signal generator 512 may shift the source output enable signals SOE to be ahead by an additional period beside the above shift based on the color pattern. The reason why the source output enable signals SOE are shifted will be described in detail later.

Figure 6:
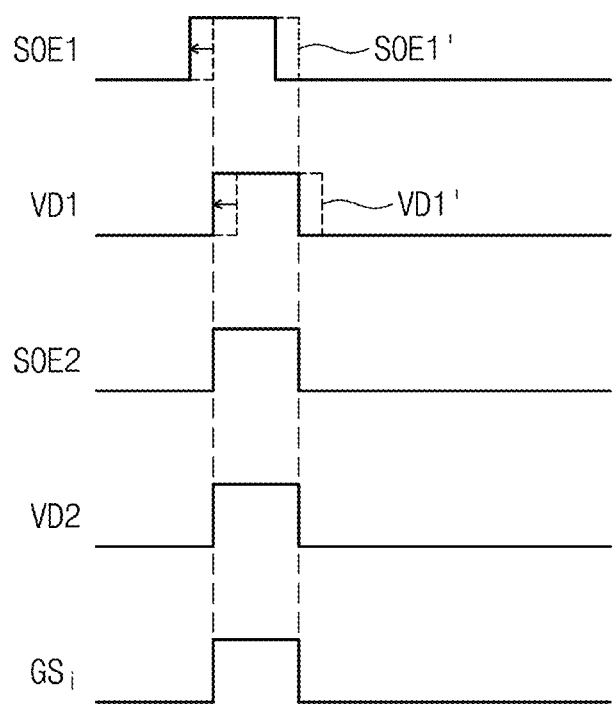
FIG. 6 is a timing diagram showing an exemplary embodiment of source output enable signals applied to error and normal source driving chips and data voltages output the source driving chips.
Figure 7:
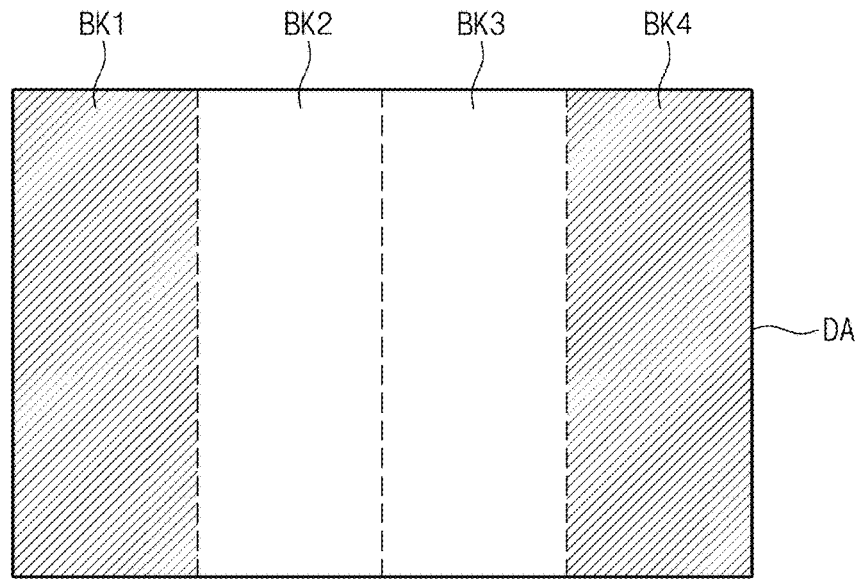
FIG. 7 is a view showing a display state of a display panel when a first source output enable signal and a second source output enable signal shown in FIG. 6 are applied at the same point in time.

FIG. 6 is a timing diagram showing an exemplary embodiment of source output enable signals applied to error and normal source driving chips and data voltages output from the source driving chips. FIG. 7 is a view showing a display state of a display panel when a first source output enable signal and a second source output enable signal shown in FIG. 6 are applied at the same point in time. For the convenience of explanation, FIG. 6 shows one data voltage applied to each of the error blocks and the normal blocks.

Referring to FIGS. 6 and 7, the source output enable signals SOE include a first source output enable signal SOE1 applied to the error source driving chips 311 and 314 and a second source output enable signal SOE2 applied to the normal source driving chips 312 and 313. The data voltages output from the source driving chips 311 to 314 include first data voltages VD1 applied to the error blocks BK1 and BK4 and second data voltages VD2 applied to the normal blocks BK2 and BK3.

The signal marked as SOE1' shown in FIG. 6 indicates a first source output enable signal which is not shifted, and hereinafter, the signal SOE1' is referred to as an error source output enable signal SOE1'. Data voltages VD1' output in synchronization with the error source output enable signal SOE1' are defined as error data voltages VD1'.

FIG. 6 shows output timings of the first and second source output enable signals SOE1 and SOE2 and the error source output enable signal SOE1' when they are output from an output terminal of the timing controller 510. The second source output enable signal SOE2 and the error source output enable signal SOE1', which are output from the output terminal of the timing controller 510, may have the same output timing.

As shown in FIG. 1, the data lines DL1 to DLn connected to output terminals of the source driving chips 311 to 314 extend in radial direction in the non-display area NDA and are connected to the display blocks BK1 to BK4. The non-display area NDA in which the data lines DL1 to DLn extending in the radial direction are arranged is defined as a fan-out part. In the fan-out part, errors in manufacturing related to the data lines DL1 to DLn may occur. For instance, the data lines may be required to have the same distance therebetween in the fan-out part, regardless which source driving chip the data lines are connected to. However, a distance between the data lines connected to the first source driving chip 311 in the fan-out part may not be the same as a distance between the data lines connected to the second source driving chip 312 in the fan-out part due to the errors in manufacturing.

In this case, the points in time at which the data voltages are applied to the display blocks BK1 to BK4 may be different from each other. The gate signal GSi may be set to match the data voltages applied to specific blocks, and as an example, the gate signal GSi may be set to match the second data voltages VD2 applied to the normal blocks BK2 and BK3. However, the gate signal GSi may not accurately match the error data voltages VD1' applied to the error blocks BK1 and BK4.

In addition, a length of the second control signal line SL2 connected to the error source driving chips 311 and 314 is longer than a length of the second control signal line SL2 connected to the normal source driving chips 312 and 313. As the length of the line becomes long, a signal is delayed by a resistance component of the line. Accordingly, although the second source output enable signal SOE2 and the error source output enable signal SOE1' are output from the output terminal of the timing controller 510 at the same point in time, the error source output enable signal SOE1' may be more delayed by the error source driving chips 311 and 314. As a result, the first data voltages VD1' output from the error source driving chips 311 and 314 in response to the error source output enable signal SOE1' may be delayed more than the second data voltage VD2.

In a case that an applying timing of the gate signal GSi is set to match the second data voltages VD2, the error data voltages VD1' may not accurately match the gate signal GSi since the error data voltages VD1' are delayed. The data voltages are charged in the pixels PX during an active period of the gate signal GSi. The second data voltages VD2 may be charged normally in the pixels PX of the normal blocks BK2 and BK3, but the error data voltages VD1' may not be charged normally in the error blocks BK1 and BK4.

In this case, as shown in FIG. 7, a difference in brightness occurs between the normal blocks BK2 and BK3 and the error blocks BK1 and BK4, and the brightness of the normal blocks BK2 and BK3 may be greater than the brightness of the error blocks BK1 and BK4. Accordingly, a boundary between the first display block BK1 and the second display block BK2 and a boundary between the third display block BK3 and the fourth display block BK4 may be visible.

In an exemplary embodiment of the invention, the timing controller 510 shifts the output timing of the first source output enable signal SOE1 applied to the error source driving chips 311 and 314 to be ahead of the second source output enable signal SOE2 by the delay period of the error data voltage VD1'.

Since the first data voltage VD1 is output from the error source driving chips 311 and 314 in response to the first source output enable signal SOE1, the output timing of the first data voltage VD1 may be controlled in the case that the output timing of the first source enable signal SOE1 is shifted. The first data voltage VD1 of which the output timing is controlled may have the same output timing as the second data voltage VD2. Accordingly, the first data voltage VD1 may be normally charged in the pixels PX of the error blocks BK1 and BK4 to which the first data voltage VD1 is applied. Since the first and second data voltages are normally charged in the pixels PX, the boundaries between the display blocks BK1 to BK4 are not recognized by a viewer, and thus the display quality may be improved.

Figure 8:
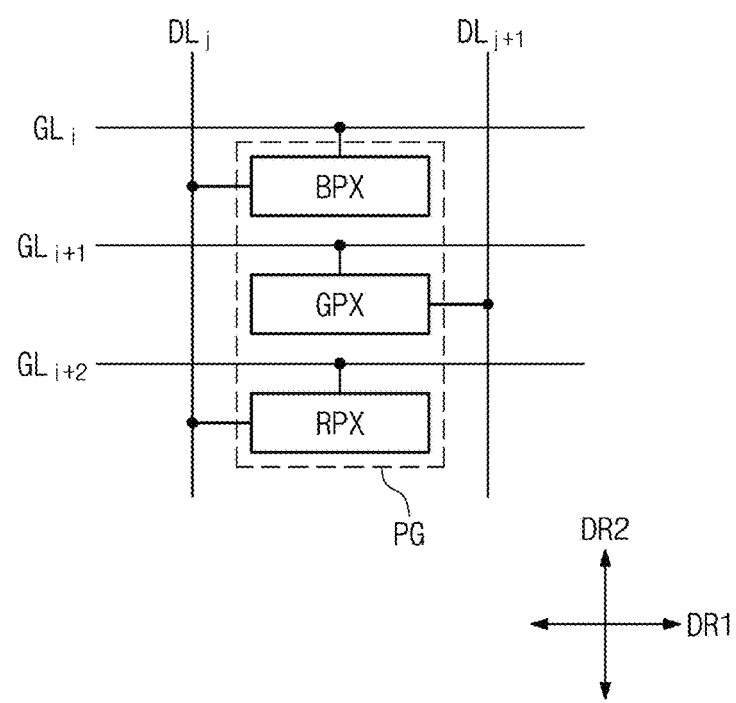
FIG. 8 is a view showing an exemplary embodiment of one-pixel group.
Figure 9:
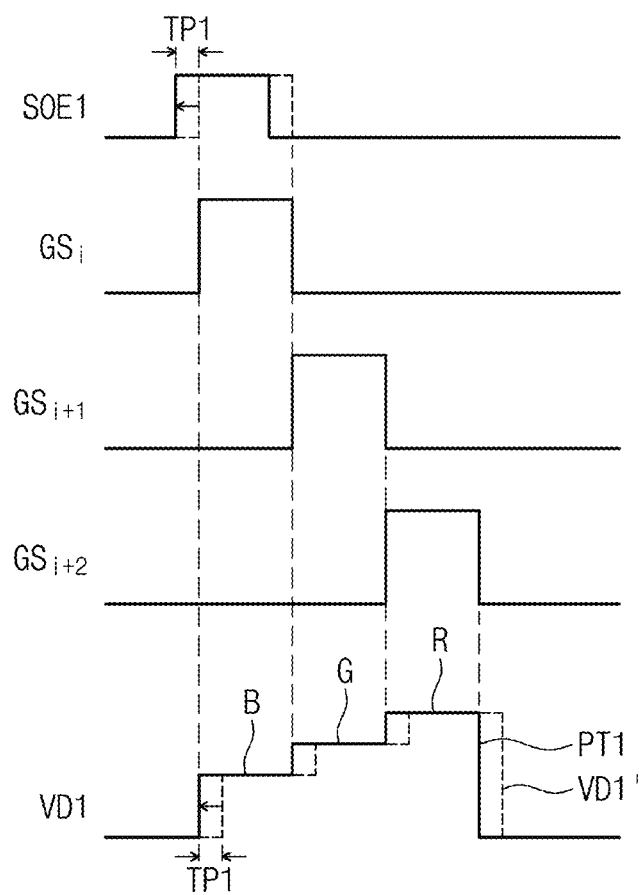
FIGS. 9 and 10 are timing diagrams showing an exemplary embodiment of shift periods of the source output enable signal used to control output timings of the data voltages applied to the pixel group shown in FIG. 8.
Figure 10:
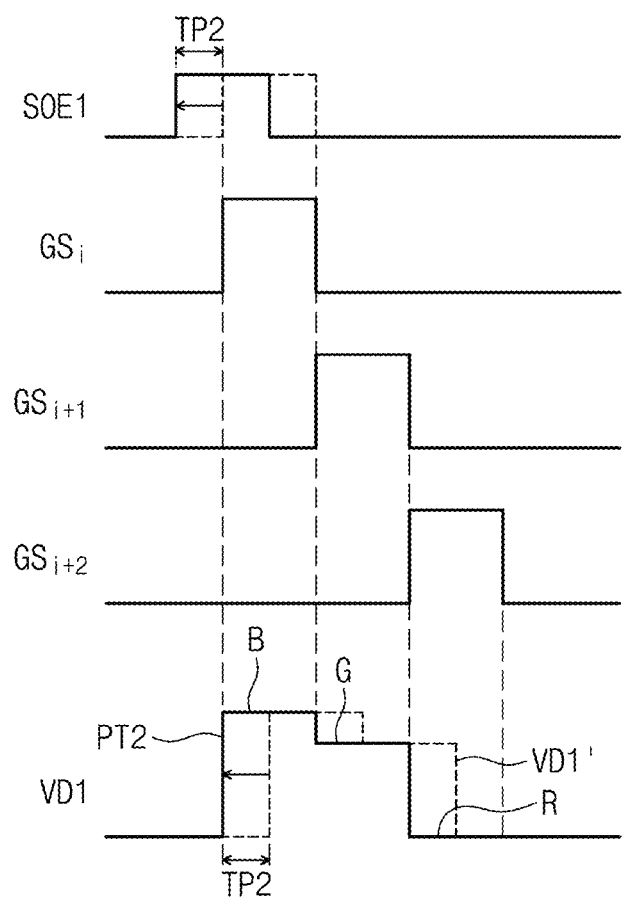

FIG. 8 is a view showing an exemplary embodiment of one-pixel group PG. FIGS. 9 and 10 are timing diagrams showing an exemplary embodiment of shift periods of the source output enable signal used to control output timings of the data voltages applied to the pixel group shown in FIG. 8. FIGS. 9 and 10 show the shift periods of the source output enable signals depending on the color patterns of different image signals from each other.

Referring to FIG. 8, the pixel group PG includes a blue pixel BPX, a green pixel GPX, and a red pixel RPX, which are arranged in the second direction DR2. Substantially, plural pixel groups PG may be arranged in a matrix form on the display panel 100. The pixel group PG shown in FIG. 8 may be one of the pixel groups arranged in the error blocks BK1 and BK4.

The blue pixel BPX, the green pixel GPX, and the red pixel RPX are connected to gate lines GLi, GLi+1, and GLi+2 and data lines DLj and DLj+1. The blue pixel BPX, the green pixel GPX, and the red pixel RPX receive the gate signals through the gate lines GLi, GLi+1, and GLi+2, respectively, and receive the first data voltages VD1 through the data lines DLj or DLj+1.

Referring to FIGS. 9 and 10, the gate signals GSi, GSi+1, and GSi+2 are applied to the blue, green, and red pixels BPX, GPX, and RPX, respectively, and the blue, green, and red pixels BPX, GPX, and RPX receive the first data voltages VD1 in response to the gate signals GSi, GSi+1, and GSi+2.

The first data voltage VD1 corresponding to blue data B, the first data voltage VD1 corresponding to green data G, and the first data voltage VD1 corresponding to red data R are applied to the blue pixel BPX, the green pixel GPX, and the red pixel RPX, respectively, in response to the first source output enable signal SOE1.

The delay of the error data voltages VD1' may be changed depending on the color pattern of the image signals RGB. For instance, as shown in FIG. 9, in a case that the image signals RGB have a first pattern PT1 (e.g., pattern for a skin color), the error data voltages VD1' may be delayed by a first period TP1. As shown in FIG. 10, in a case that the image signals RGB have a second pattern PT2 (e.g., pattern for a cyan color), the error data voltages VD1' may be delayed by a second period TP2 longer than the first period TP1. Although not shown in figures, in a case that the image signals RGB have a third pattern (e.g., pattern for the third color other than the skin and cyan colors), the error data voltages VD1' may be delayed by a third period longer than the first period TP1 and shorter than the second period TP2. In an exemplary embodiment, as an example, the first period TP1, the second period TP2, and the third period may be about 10 nanoseconds (ns), about 20 ns, and about 15 ns, respectively.

As an example, the first pattern PT1 includes the blue data B having the grayscale value of 76, the green data G having the grayscale value of 127, and the red data R having the grayscale value of 255. The second pattern PT2 includes the blue data B having the grayscale value of 255, the green data G having the grayscale value of 127, and the red data R having the grayscale value of 0. Levels of the error data voltages VD1' and the first data voltages VD1 correspond to the grayscale values of the first pattern PT1 or the grayscale values of the second pattern PT2.

As the level of the error data voltage VD1' applied to the blue pixel BPX that is a first pixel of the pixel group PG increases, a charge time increases. In the case that the charge time increases, the error data voltages VD1' may be more delayed. Accordingly, the error data voltages VD1' corresponding to the grayscale values of the second pattern PT2 may be more delayed than the error data voltages VD1' corresponding to the grayscale values of the first pattern PT1.

In the case that the image signals RGB have the first pattern PT1, the first source output enable signal SOE1 is shifted to be ahead of the second source output enable signal SOE2 by the first period TP1. In the case that the image signals RGB have the second pattern PT2, the first source output enable signal SOE1 is shifted to be ahead of the second source output enable signal SOE2 by the second period TP2. Although not shown in figures, in the case that the image signals RGB have the third pattern PT3, the first source output enable signal SOE1 is shifted to be ahead of the second source output enable signal SOE2 by the third period.

Since the first source output enable signal SOE1 is shifted, the applying timing of the first data voltages VD1 may be controlled to match the gate signals GSi, GSi+1, and GSi+2. Accordingly, the first data voltages VD1 may be normally charged in the pixels PX.

In a case that a shift period of the first source output enable signal SOE1 is controlled to fit only one-color pattern, the output timing of the first data voltages VD1 may not be controlled to match the gate signals GSi, GSi+1, and GSi+2 with respect to other color patterns. In an exemplary embodiment of the invention, since the shift period of the first source output enable signal SOE1 is controlled differently depending on the color pattern of the image signals RGB, the output timing of the first data voltages VD1 may be controlled to match the various color patterns.

In this exemplary embodiment, three color patterns are described. However, in other exemplary embodiments, more various color patterns may be used, and thus the shift period of the first source output enable signal SOE1 may be variously controlled.

Figure 11:
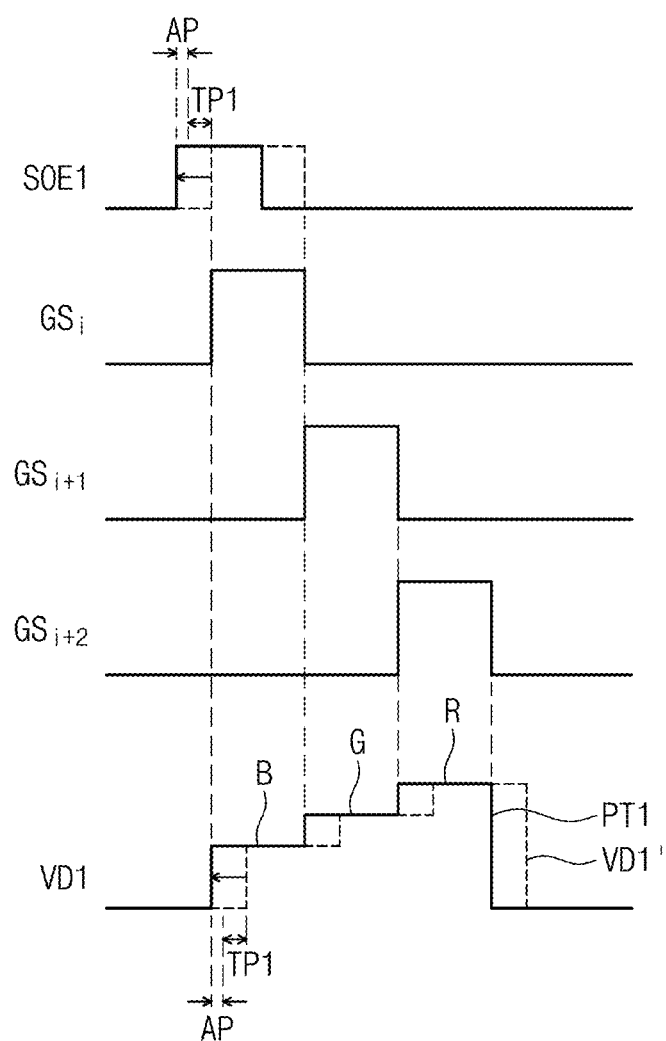
FIGS. 11 and 12 are timing diagrams showing an exemplary embodiment of shift periods of the source output enable signal depending on temperature information when a surrounding temperature of the display panel is higher than or equal to a reference temperature.
Figure 12:
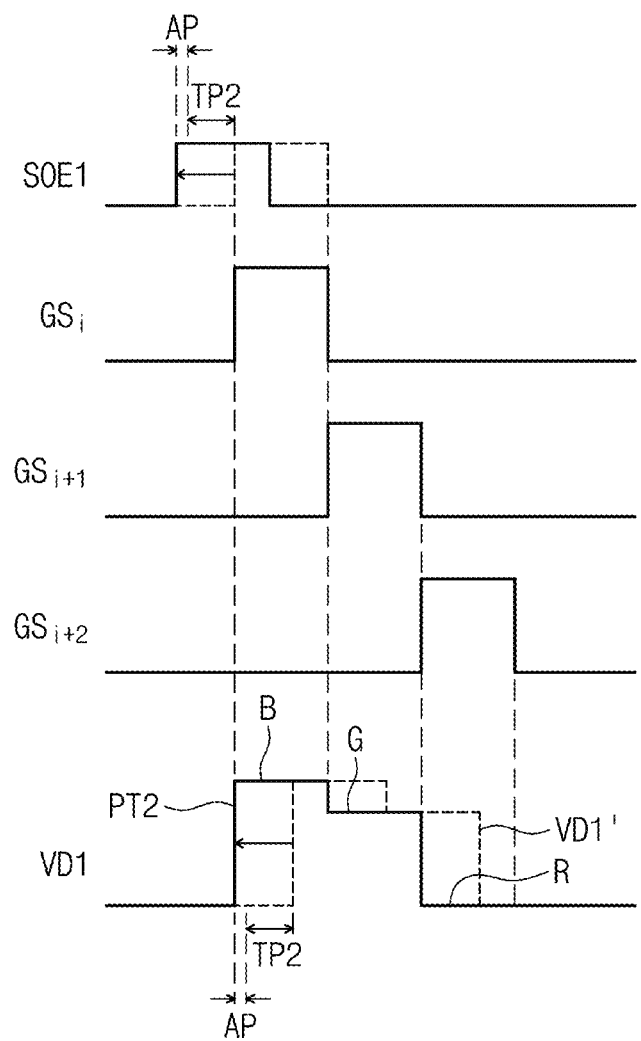

FIGS. 11 and 12 are timing diagrams showing an exemplary embodiment of shift periods of the source output enable signal depending on temperature information when a surrounding temperature of the display panel is higher than or equal to a reference temperature.

Referring to FIG. 11, in the case that the surrounding temperature of the display panel 100 is higher than or equal to the reference temperature and the image signals RGB have the first pattern PT1, the first source output enable signal SOE1 shifted by the first period TP1 may be further shifted to be ahead of the second source output enable signal SOE2 by an additional period AP.

Referring to FIG. 12, in the case that the surrounding temperature of the display panel 100 is higher than or equal to the reference temperature and the image signals RGB have the second pattern PT2, the first source output enable signal SOE1 shifted by the second period TP2 may be further shifted to be ahead of the second source output enable signal SOE2 by the additional period AP.

Although not shown in figures, in the case that the surrounding temperature of the display panel 100 is higher than or equal to the reference temperature and the image signals RGB have the third pattern, the first source output enable signal SOE1 shifted by the third period may be further shifted to be ahead of the second source output enable signal SOE2 by the additional period AP.

In a case that the display apparatus 600 is driven at a high temperature equal to or higher than the reference temperature, driving characteristics of the liquid crystal molecules of the liquid crystal layer LC, the transistors of the pixel PX, and elements of the gate and data drivers 200 and 300 may be deteriorated. In this case, the output timing of the data voltages may be delayed. For instance, in the case that the error data voltages VD1' are delayed depending on the color pattern of the image signals RGB and whether the surrounding temperature is the high temperature, the error data voltages VD1' may be further delayed by the additional period AP in addition to the delay by the color pattern.

In an exemplary embodiment of the invention, the first source output enable signal SOE1 is further shifted depending on the surrounding temperature of the display panel 100, and thus the delay of the data voltages, which occurs due to the surrounding temperature, may also be compensated.

Consequently, the display apparatus 600 according to the invention controls the output timings of the data voltages provided to the display blocks BK1 to BK4 of the display panel 100 to synchronize the output timings of the data voltages to each other, and thus the display quality may be improved.

Figure 13:
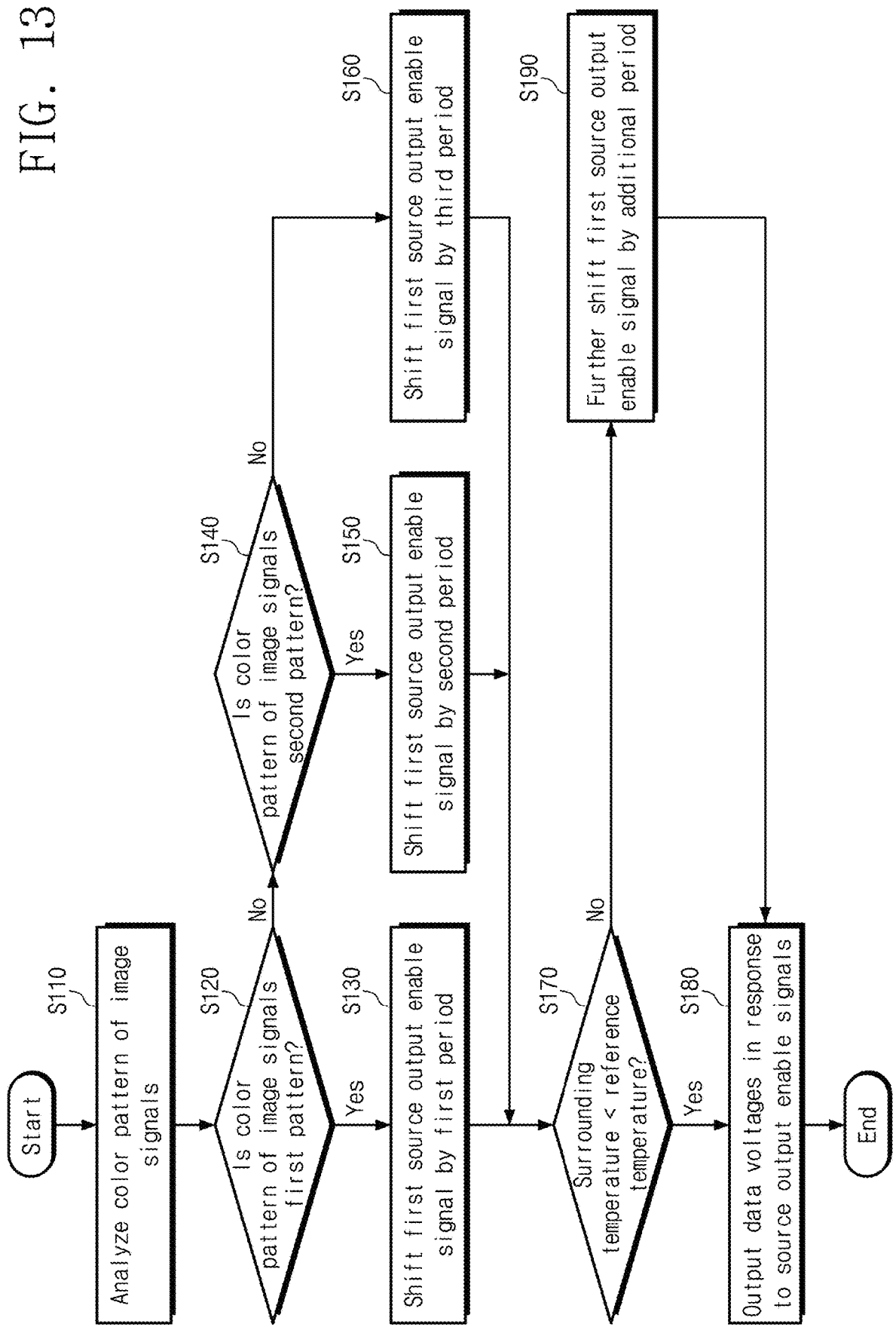
FIG. 13 is a flowchart showing an exemplary embodiment of a method of driving a display apparatus according to the invention.

FIG. 13 is a flowchart showing an exemplary embodiment of a method of driving a display apparatus according to the invention.

Referring to FIG. 13, the color pattern of the image signals RGB is analyzed in operation S110. In operation S120, it is checked whether the color pattern of the image signals RGB is the first pattern PT1. In the case that the color pattern of the image signals RGB is the first pattern PT1, the first source output enable signal SOE1 is shifted by the first period TP1 in operation S130.

In the case that the color pattern of the image signals RGB is not the first pattern PT1, it is checked whether the color pattern of the image signals RGB is the second pattern PT2 in operation S140. In the case that the color pattern of the image signals RGB is the second pattern PT2, the first source output enable signal SOE1 is shifted by the second period TP2 in operation S150. In the case that the color pattern of the image signals RGB is neither the first pattern PT1 nor the second pattern PT2, that is, in the case that the color pattern of the image signals RGB is the third pattern, the first source output enable signal SOE1 is shifted by the third period in operation S160.

After the first source output enable signal SOE1 is shifted by the first period TP1, the second period TP2, or the third period, it is checked whether the surrounding temperature is lower than the reference temperature in operation S170. In the case that the surrounding temperature is lower than the reference temperature, the data voltages VD1 and VD2 are output in response to the source output enable signals SOE1 and SOE2, respectively (S180). That is, in the case that the surrounding temperature is lower than the reference temperature, the output timing of the first data voltages VD1 is controlled by the first source output enable signal SOE1 that is shifted by the first period TP1, the second period TP2, or the third period, and then the first data voltages VD1 are output.

In the case that the surrounding temperature is equal to or higher than the reference temperature, the first source output enable signal SOE1 that is shifted by the first period TP1, the second period TP2, or the third period is further shifted by the additional period AP. The output timing of the first data voltages VD1 is controlled by the first source output enable signal SOE1 that is further shifted by the additional period AP, and then the first data voltages VD1 are output in operation S190.

Due to the method of driving the display apparatus 600 according to the invention, the output timings of the data voltages provided to the display blocks BK1 to BK4 of the display panel 100 are controlled to match the output timings of the data voltages to each other depending on the color pattern of the image signals RGB and the surrounding temperature. Thus, the display quality may be improved.

Although the exemplary embodiments of the invention have been described, it is understood that the invention should not be limited to these exemplary embodiments described above, but various changes and modifications can be made by one ordinary skilled in the art within the spirit and scope of the invention as hereinafter claimed.

What is claimed is:
1. A display apparatus comprising:
   a display panel which comprises a plurality of display blocks, wherein the plurality of display blocks includes an error block and a normal block other than the error block, wherein each of the error block and the normal block includes a plurality of pixels;
   a gate driver which outputs gate signals to the pixels;
   a data driver which receives image data and outputs data voltages corresponding to the image data to the pixels; and
   a timing controller which converts an image signal input thereto, outputs the converted image signal to the data driver as the image data, and controls a driving timing of the gate driver and the data driver,
   wherein the timing controller controls output timings of a first data voltage output to the pixels of the error block to have a same output timing as a second data voltage output to the pixels of the normal block, and shifts an output timing of a source output enable signal used to control the output timings of the first data voltage applied to the error block depending on a color pattern of the image signal corresponding to the pixels of the error block in order for the output timing of the first data voltage output to the pixels of the error block to be the same as the output timing of the second data voltage output to the pixels of the normal block, and
   wherein the color pattern includes a first color pattern, a second color pattern and a third color pattern, and output timings of the source output enable signal corresponding to the first pattern, the second pattern and the third pattern are different from one another.

2. The display apparatus of claim 1, wherein the data driver comprises a plurality of source driving chips that receives the image data and outputs the data voltages, and the source driving chips are connected to the display blocks, respectively, and output the data voltages to the pixels.

3. The display apparatus of claim 2, wherein the timing controller generates a plurality of source output enable signals, outputs the source output enable signals to the source driving chips, respectively, and controls the output timings of the at least data voltages output to the pixels of the predetermined display block.

4. The display apparatus of claim 3, the source driving chips comprise an error source driving chip connected to the error block and a normal source driving chip connected to the normal block, and the source output enable signals comprise a first source output enable signal output to the error source driving chip and a second source output enable signal output to the normal source driving chip.

5. The display apparatus of claim 4, wherein the timing controller shifts an output timing of the first source output enable signal such that the output timing of the first source output enable signal is ahead of an output timing of the second source output enable signal.

6. The display apparatus of claim 4, wherein the color pattern of the image signal comprises:
   the first pattern having a first color;
   the second pattern having a second color; and
   the third pattern having a third color other than the first and second colors.

7. The display apparatus of claim 6, wherein,
   in a case that the color pattern of the image signal is the first pattern, the timing controller shifts an output timing of the first source output enable signal to be ahead of an output timing of the second source output enable signal by a first period,
   in a case that the color pattern of the image signal is the second pattern, the timing controller shifts the output timing of the first source output enable signal to be ahead of the output timing of the second source output enable signal by a second period, in a case that the color pattern of the image signal is the third pattern, the timing controller shifts the output timing of the first source output enable signal to be ahead of the output timing of the second source output enable signal by a third period, the second period is longer than the first period, and the third period is longer than the first period and shorter than the second period.

8. The display apparatus of claim 7, wherein the first period is set to about 10 nanoseconds, the second period is set to about 20 nanoseconds, and the third period is set to about 15 nanoseconds.

9. The display apparatus of claim 7, further comprising a temperature detector which detects a surrounding temperature of the display panel, wherein the timing controller shifts the output timing of the first source output enable signal to be ahead of the output timing of the second source output enable signal by an additional period in addition to the first period, the second period, or the third period, in a case that the detected temperature is equal to or higher than a reference temperature.

10. The display apparatus of claim 6, wherein the first color is a skin color, the second color is a cyan color, and the third color is a color other than the skin color and the cyan color.

11. The display apparatus of claim 6, wherein the image signal comprises red data, green data, and blue data, each of the data of the image signal has a grayscale value from 0 to 255, the first pattern comprises the blue data having the grayscale value equal to or smaller than 80, the green data having the grayscale value from 100 to 120, and the red data having the grayscale value of 255, the second pattern comprises the blue data having the grayscale value of 255, the green data having the grayscale value from 100 to 120, and the red data having the grayscale value equal to or smaller than 80, and the third pattern comprises the blue data having the grayscale value greater than 80 and smaller than 255, the green data having the grayscale value equal to or greater than 0 and smaller than 100 or the grayscale value greater than 120 and equal to or smaller than 255, and the red data having the grayscale value greater than 80 and smaller than 255.

12. A method of driving a display apparatus, comprising:

receiving an image signal and analyzing a color pattern of the image signal;

converting the received image signal to image data;

generating data voltages corresponding to the image data; and outputting the data voltages to pixels of a plurality of display blocks, wherein the plurality of display blocks includes an error block and a normal block other than the error block, each of the error block and the normal block includes a plurality of pixels, wherein outputting the data voltages to the pixels comprises controlling output timings of a first data voltage output to the pixels of the error block to have a same output timing as a second data voltage output to the pixels of the normal block, and shifts an output timing of a source output enable signal used to control the output timings of the first data voltage applied to the error block depending on the color pattern of the image signal corresponding to the pixels of the error block in order for the output timing of the first data voltage output to the pixels of the error block to be the same as the output timing of the second data voltage output to the pixels of the normal block, and wherein the color pattern includes a first color pattern, a second color pattern and a third color pattern, and output timings of the source output enable signal corresponding to the first pattern, the second pattern and the third pattern are different from one another.

13. The method of claim 12, further comprising generating a plurality of source output enable signals and controlling the output timings of the at least data voltages output to the pixels of the predetermined display block, wherein the data voltages are output in response to the source output enable signals.

14. The method of claim 13, wherein the source output enable signals comprise a first source output enable signal which controls the output timings of the data voltages output to the error block and a second source output enable signal which controls the output timings of the data voltages output to the normal block.

15. The method of claim 14, wherein an output timing of the first source output enable signal is shifted such that the output timing of the first source output enable signal is ahead of an output timing of the second source output enable signal.

16. The method of claim 14, wherein the color pattern of the image signal comprises:

the first pattern having a first color;

the second pattern having a second color; and the third pattern having a third color other than the first and second colors.

17. The method of claim 16, wherein, in a case that the color pattern of the image signal is the first pattern, an output timing of the first source output enable signal is shifted to be ahead of an output timing of the second source output enable signal by a first period, in a case that the color pattern of the image signal is the second pattern, the output timing of the first source output enable signal is shifted to be ahead of the output timing of the second source output enable signal by a second period, in a case that the color pattern of the image signal is the third pattern, the output timing of the first source output enable signal is shifted to be ahead of the output timing of the second source output enable signal by a third period, the second period is longer than the first period, and the third period is longer than the first period and shorter than the second period.

18. The method of claim 17, further comprising detecting a surrounding temperature of the display blocks, wherein the output timing of the first source output enable signal is shifted to be ahead of the output timing of the second source output enable signal by an additional period in addition to the first period, the second period, or the third period, in a case that the detected temperature is equal to or higher than a reference temperature.

19. The method of claim 16, wherein the first color is a skin color, the second color is a cyan color, and the third color is a color other than the skin color and the cyan color.

20. The method of claim 16, wherein the image signal comprises red data, green data, and blue data, each of the data of the image signal has a grayscale value from 0 to 255, the first pattern comprises the blue data having the grayscale value equal to or smaller than 80, the green data having the grayscale value from 100 to 120, and the red data having the grayscale value of 255, the second pattern comprises the blue data having the grayscale value of 255, the green data having the grayscale value from 100 to 120, and the red data having the grayscale value equal to or smaller than 80, and the third pattern includes the blue data having the grayscale value greater than 80 and smaller than 255, the green data having the grayscale value equal to or greater than 0 and smaller than 100 or the grayscale value greater than 120 and equal to or smaller than 255, and the red data having the grayscale value greater than 80 and smaller than 255.

\* \* \* \* \*